Sept. 10, 1935.  O. T. FRANCIS  2,014,174

LIGHT CONTROL DEVICE

Filed Dec. 26, 1933

INVENTOR

Oliver Thomas Francis

Patented Sept. 10, 1935

2,014,174

UNITED STATES PATENT OFFICE 2,014,174

LIGHT CONTROL DEVICE

Oliver Thomas Francis, San Diego, Calif.

Application December 26, 1933, Serial No. 703,950

9 Claims. (Cl. 250—8)

This invention relates to transmission systems and more particularly to eliminating interference in systems where a plurality of carrier waves are used for the transmission of the signal, and still more particularly to light transmission systems.

In the transmission of signals by carrier waves the selectively tuned means is subject to shock excitation. Often the source of the shock excitation is but of a few micro-seconds duration. The length of the disturbance set up by the shock in the selectively tuned means may persist for several seconds after the shocking means has ceased to exist. In radio transmission a flash of lightning may be of only a micro-second duration. The receiving antenna and subsequent tuned circuits in the succeeding stages of vacuum tube amplification are set into violent oscillation lasting several thousandths of a second. In light chopping carrier frequency transmission systems the circuit tuned to said light chopped carrier, is similarly set into oscillation by sudden flashes of light. In sound carrier waves transmission systems similar shock excitation effects appear in the selectively tuned receiving means as the result of explosions in gun fire.

It is an object of this invention, to illustrate a means of eliminating said disturbances.

Another object is to illustrate how the tuned selective means may be located in a circuit at a point not susceptible to shock excitation.

A plurality of carrier frequencies have been used for the transmission of a single radio signal by electro-magnetic waves, but as far as is known these carrier frequencies have been additive, the magnitude of each carrier increasing when a signal is impressed on the transmission means. It is an object of this invention to provide means for producing differential simultaneous variations in the magnitude of a plurality of electro-magnetic carriers, to produce aperiodic means for picking up said plurality of carriers and to render the selective means responsive only to said differential simultaneous variations.

Various forms of the Wheatstone bridge have been utilized in the input and output circuits of vacuum tubes. Such systems are particularly prevalent in color matching of two different colors by photo-electric means. In some cases the variable arms of the Wheatstone bridge have been arranged differentially resulting in the functioning of the device when the object being analyzed fails to give off equal magnitudes of said two colors. A change of sufficient magnitude in one of these colors however will result in functioning of the device. It is an object of this invention to illustrate means for rendering the device operative only upon the simultaneous differential change of said colors, and as a further novel feature to render the device responsive only to the increase of a predetermined one of said colors and the simultaneous decrease of a different one of said colors.

A further object is to illustrate means for rendering a receiving device operable only by the simultaneous change of a plurality of sources of energy, said sources being located geographically remote from each other.

A still further object is to illustrate means whereby a signal responsive device controlled by a plurality of sources of light may be rendered operative only by producing changes in said lights in a predetermined order of succession.

Gas discharge devices on which an A. C. current is impressed have been used as a source of light carrier frequencies. It is well known that variations in intensity of light emitted by an electron emitting light radiating source (such as the incandescent filament of a thermionic vacuum tube) can be produced by variations in the space charge around said source. Davis in U. S. Patent No. 1,894,462 issued January 17, 1933 has utilized the principle that a medium of ionized gas when giving off luminous energy of sufficient intensity will obstruct the rays of luminous energy directed thru this medium, by reason of the quantum absorption of energy by atoms and molecules in an excited state, resulting in additional ionization with increased value of the discharge. It is an object of this invention to utilize all three of these means in an evacuated container, and to utilize the increase in high frequency light given off by the gas and the simultaneous decrease in low frequency light given off by the incandescent body as the transmitted signal, and to provide receiving means responsive only to this simultaneous differential change.

Another object is to produce variations in light emitted by an incandescent body by varying the state of ionization of the gas surrounding said incandescent body, and to utilize said variations in light as signaling means.

Another object is to produce light energy at the low frequency end of the visible spectrum, to change said energy into high frequency light energy, and to provide receiving means responsive only to a simultaneous differential change in magnitude of colors striking said receiving means.

These and other objects will become apparent from the following detailed description, and the appended claims, taken in connection with the drawing in which:

Figure 1:
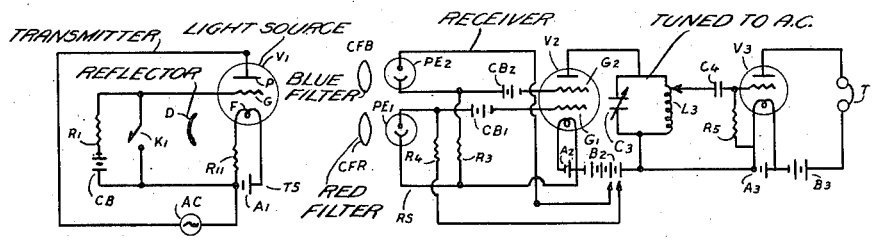
Fig. 1 represents a light transmission system, embodying my invention.

Referring to Fig. 1, transmitting station TS, is composed of grid controlled gas discharge device V1 having cathode F, heated by "A" battery A1, control electrode G, anode P. The cathode F may be made of any material which emits electrons when incandescent, such as tungsten. Such material often has a marked temperature coefficient. When the electrons comprising the space current are liberated from such cathodes energy is absorbed from said cathodes thereby cooling them and decreasing their resistance thus permitting increased cathode current from heating supplies such as A1. To prevent such increases, the resistance R11 has been inserted in the negative lead of F. As the space current thru V1 increases the IR drop due to said space current passing thru R11 increases to the degree that part of said space current flows down the positive lead of F and thru A1 in the reverse direction to the normal cathode heating current. Such a reaction prevents A1 from furnishing heating current to F and permits cathode F to cool and thereby works in conjunction with the electron energy absorptive effect, which also cools the cathode. R11 has been chosen of a value greater than the normal filament rheostat in order to accentuate this effect. R11 further tends to increase the negative potential on grid G as the plate current increases, thereby aiding in deionization of the gases of the tube. In the anode to cathode path is a source of alternating current AC. In the input circuit of V1, has been connected a "C" battery CB for placing a high negative potential on grid G thru resistance R1 when key K1 is raised. Reflector D directs the light given off by V1 towards receiving station RS. The receiving station RS comprises vacuum tube V2, having an anode, a cathode heated by A2, and a plurality of control electrodes G1 and G2. Photo-electric cell PE1 has been connected in series with resistance R4 and battery B2, the cathode of PE1 being connected to the cathode of V2 and the anode of PE1 being connected to G1 thru biasing battery CB1. Photo-electric cell PE2 has been connected in series with resistance R3 and battery B2, the positive terminal of R3 being connected to G2 thru CB2, and the negative terminal of R3 to the cathode of V2. Color filter CFR permits red light to strike PE1 and color filter CFB permits blue light to strike PE2. The "C" batteries CB1, and CB2 impress negative potentials on the grids G1 and G2, respectively, so that both of these grids may be biased past the plate current cut off value, when K1 at the transmitting station is raised. In the output circuit of V2 has been connected a source of anode current B2 and L3 C3 tuned to the frequency of AC. Variations in voltage across L3C3 are passed on thru C4 and impressed on control electrode of V3 by R5. In the output circuit of V3 is a source of anode voltage B3 and translating device T.

In operation when key K1 is closed the negative grid bias impressed on grid G of gas discharge device V1 by CB is removed thereby allowing a pulsating current to flow between anode P and cathode F. Each pulse of current produces a blue light by reason of the ionization of gas between the anode and cathode of the tube and at the same instant decreases the amount of red light given off by F due to the energy absorbed therefrom by liberation of electrons as well as by reason of the obstructive effect of ionized gases utilized in the before mentioned U. S. Patent to Davis.

This increase in blue light passes thru color filter CFB to photo-electric cell PE2, and tends to place a positive potential on grid G2. At the same instant the decrease of red light from F striking PE1 thru color filter CFR tends to place a positive potential on grid G1, and a pulse of current will flow in the output circuit of V2, thereby energizing oscillatory circuit L3C3 at the frequency of generator AC, which in turn produces a response in translating device T. The oscillatory circuit L3C3 would not be energized by a flash of light from a bursting bomb, since the incandescent particles thereof would produce an increase of light throughout the visible spectrum and while G2 would be thrown positive, G1 would be thrown further negative. If the duration of the flash were such as to render V2 non-responsive to one or two pulses of light sent out by V1 the inertia of L3C3 would be such as to allow it to continue to oscillate at frequency of AC until the interferring flash had passed.

Figure 2:
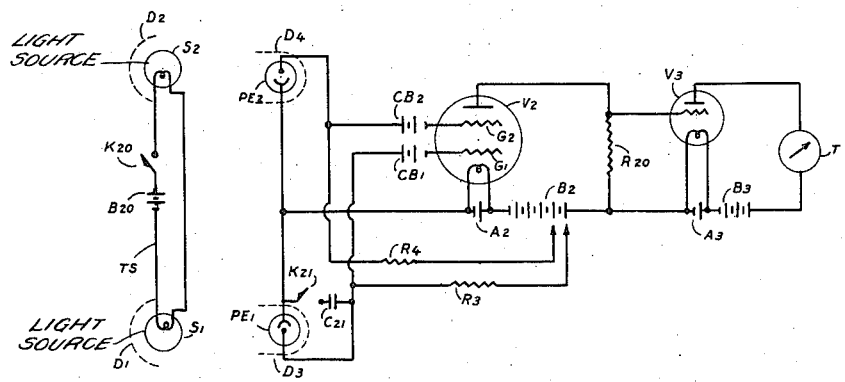
Fig. 2 represents a modification of the signal transmitter and selective receiving means.

Referring to Fig. 2, transmitting station TS is composed of sources of light signal energy S1 and S2, in the form of two incandescent lights, geographically removed from each other. Battery B20 furnishes current to the filaments of these two lights when key K20 is closed. Reflector D1 directs light from S1 to photo-electric cell PE1 said cell being screened from other sources of light by screen D3. The reflector D2 directs light from S2 to photo-electric cell PE2, said last cell being screened from other sources of light by screen D4. Resistance R3 and R4 have been inserted as loads of PE1 and PE2 respectively. Condenser C21 may be placed in parallel with PE1, when switch K21 is closed for reasons hereafter to be explained. The resistance R20 has been substituted for the L3C3 load of Fig. 1, and meter T has been used as the translating device in the output circuit of V3. In other respects the labels and functioning of the device is similar to Fig. 1.

In operation when key K20 is opened (switch K21 being opened) decreases of light from S1 striking PE1 impresses a positive potential on G1 opposing negative C battery CB1, and decreases of light from S2 striking PE2 simultaneously impresses a positive potential on G2 opposing negative C battery CB2. Both G1 and G2 being thrown positive an increased current will flow thru R20 and decrease the current thru translating device T.

The functioning of the circuit shown in Fig. 2 may be changed in such a manner as to render it operable when a predetermined succession of events takes place, but inoperable when the reverse order of succession of said events takes place. With both keys K20 and K21 closed light from S1 falling on photo-electric cell PE1 renders it conductive with consequent large IR drop across R3, thus permitting CB1 to bias G1 past the space current cut-off of V2. Similarly light from S2 falling on PE2 renders it conductive with consequent large IR drop across R4, thus permitting CB2 to bias G2 past the space current cut-off of V2. Since the space current of V2 is blocked there will be substantially no IR drop thru R20 and the grid and filament of V3 will be at virtually the same potential, and translating device T will read maximum. An object first interrupting light from S1 will cause the resistance of PE1 to increase with the result that a positive potential will be built up on the grid side of C21 thereby unbiasing G1 to the extent that it will not block the space current of V2. If now the object continues to move and interrupts light from S2 (before the positive charge on the grid side of C21 has had time to leak off) the resistance of PE2 will similarly be increased and G2 will also be thrown positive. Both G1 and G2 being thrown positive a large space current will flow thru V2 with consequent large IR drop across R20 and reduction of space current thru V3 with consequent minimum reading of translating device T. An object interrupting light from S2 and then light from S1 cannot operate the device due to the fact that there being no condenser in parallel with PE2, grid G2 would be negative when the object interrupted light from S1.

The term gas discharge device in the following claims will include within its meaning tubes utilizing metallic vapors such as mercury vapor tubes.

While specific forms of the invention have been described it will be understood that numerous variations are apparent to those skilled in the art, without departing from the spirit of the invention. For example the photo-electric currents might be amplified by any known means of vacuum tube amplification before being applied to the tube with the plurality of control grids. The invention is to be limited only by prior art and as described in the following claims.

What is claimed is:

1. The combination with a source of two different frequency lights, the magnitude of which vary differentially, means for directing said lights towards a receiving station, a plurality of devices each selective to a different one of said frequencies at said receiving station, a vacuum tube having an anode, a cathode, and a plurality of control electrodes, a source of space current and a load connected between said cathode and said anode, means for controlling one of said control electrodes by one of said receiving devices, means for controlling a second of said control electrodes by a second of said receiving devices, a translating device, and means for controlling said translating device by said space current.

2. In a signaling system, a source of two different frequency electro-magnetic waves, the magnitude of which vary differentially at a predetermined frequency, a plurality of receiving devices each selective to a different one of said electro-magnetic waves, a vacuum tube having an anode, a cathode, and a plurality of control electrodes, a source of space current, and a load tuned to said predetermined frequency connected between said cathode and said anode, means for impressing a positive potential on one of said control electrodes as the magnitude of one of said electro-magnetic waves increases, means for impressing a positive potential on a second of said control electrodes as a second of said electro-magnetic waves decreases, a translating device, and means for controlling said translating device by voltage variations across said load.

3. In a signaling system, a source of two different frequency carrier waves, the magnitude of which simultaneously vary differentially, a plurality of receiving devices each selective to a different one of said carrier waves, a source of vacuum tube space current, a plurality of vacuum tube control electrodes in the path of said space current, means for applying a positive potential to a first of said control electrodes as the magnitude of a first of said carrier waves increases, means for applying a positive potential to a second of said control electrodes as the magnitude of a second of said carrier waves decreases, a translating device, and means for controlling said translating device by said space current.

4. The combination with a source of two different carrier frequencies, the magnitude of which vary differentially at a predetermined frequency, a plurality of receiving devices each selective to a different one of said carrier frequencies, a vacuum tube having an output circuit, a plurality of control electrodes, means for controlling one of said control electrodes by one of said receiving devices, means for controlling a second of said control electrodes by a second of said receiving devices, means selective to current of said predetermined frequency in said output circuit, a translating device, and means for controlling said translating device by said current selected in said output circuit.

5. In a light signaling system, a gas discharge device, having a plate, a filament, and a grid, a variable source of plate current in the circuit of said plate, means for rendering said filament incandescent, means for varying the potential on said grid for controlling said plate current, a first receiving device selective to light given off by said filament, a second receiving device selective to light given off by the luminous gas of said gas discharge device, a source of vacuum tube space current, a plurality of control electrodes in the path of said space current, means for controlling the potential of one of said control electrodes by one of said receiving devices, means for controlling the potential of a second of said control electrodes by a second of said receiving devices, a translating device and means for controlling said translating device by said current.

6. In a light signaling system, a gas discharge device having a plate, a filament, and a grid, a variable source of plate current connected in the circuit of said plate, a direct current source of filament current for rendering said filament incandescent, an impedance common to the circuits of said plate and said filament for limiting said filament current as said plate current increases, means for varying the potential of said grid for controlling said plate current, a first receiving device selective to light given off by said filament, a second receiving device selective to light given off by the luminous gas of said discharge device, a source of vacuum tube space current, a plurality of control electrodes in the path of said space current, means for controlling the potential on one of said control electrodes by one of said receiving devices, means for controlling the potential of a second of said control electrodes by a second of said receiving devices, a translating device, and means for controlling said translating device by said space current.

7. In a light control system, a source of two different colored lights the magnitude of which vary differentially at a predetermined frequency, said source comprising a gas discharge device having an anode, a cathode and a control electrode, means for rendering said cathode incandescent, a source of space current varying at said predetermined frequency connected between said cathode and said anode, means for preventing the production of one of said colored lights, said last means comprising means for varying the potential of said control electrode, a plurality of photo-electric cells each selective to a different one of said colors, a vacuum tube having an output circuit and a plurality of control grids, a load tuned to said predetermined frequency connected in said output circuit, means for controlling one of said grids by one of said cells, means for controlling a second of said grids by a second of said cells, a translating device, and means for controlling said translating device in accordance with voltage variations across said load.

8. The combination with a means for producing two different colored lights, the magnitude of which vary differentially at a predetermined frequency, a plurality of light sensitive devices each selective to a different one of said colored lights, a vacuum tube having an output circuit, and a plurality of control electrodes, means for controlling one of said control electrodes by one of said devices, means for controlling a second of said control electrodes by a second of said devices, means selective to current of said predetermined frequency connected in said output circuit, and means for translating said selected current of said predetermined frequency into signals.

9. The combination with a source of high frequency light, a source of low frequency light a plurality of receiving devices each selective to a different one of said frequencies, a source of vacuum tube space current, a plurality of vacuum tube control electrodes in the path of said space current, means for controlling the potential of one of said control electrodes by one of said receiving devices, means for controlling the potential of a second of said control electrodes by a second of said receiving devices, a translating device, and means for controlling said translating device by said space current.

OLIVER THOMAS FRANCIS.